Dec. 14, 1965     W. V. SMITH     3,223,315
UNITIZED CENTRIFUGAL SEPARATOR
Filed Jan. 22, 1963
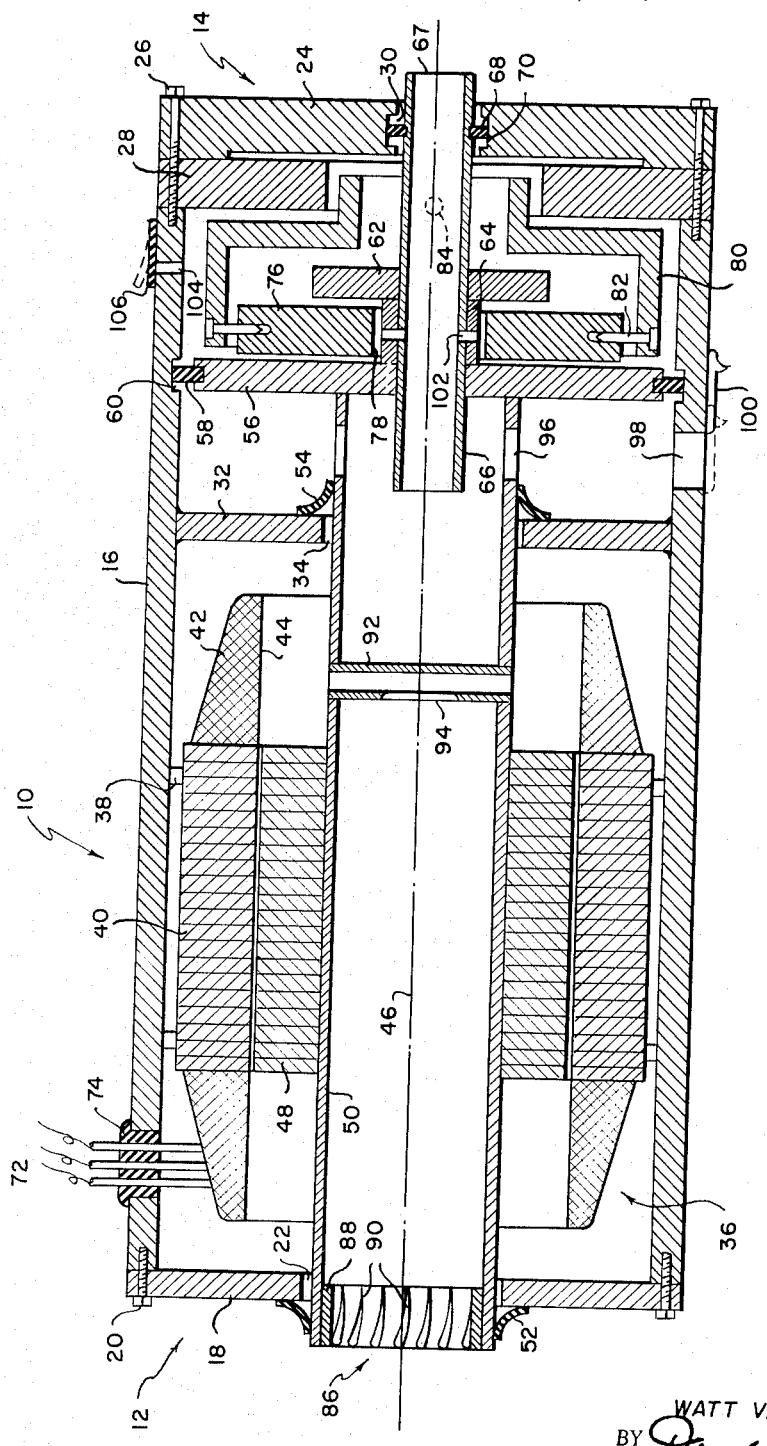
INVENTOR.
WATT V. SMITH
BY Donald A. Kaul
B. L. Zangwill
ATTORNEYS

United States Patent Office 3,223,315
Patented Dec. 14, 1965

3,223,315
UNITIZED CENTRIFUGAL SEPARATOR
Watt V. Smith, 315 Old County Road,
Severna Park, Md.
Filed Jan. 22, 1963, Ser. No. 253,233
9 Claims. (Cl. 233—24)
(Granted under Title 35, U.S. Code (1952), sec. 266)

The invention described herein may be manufactured and used by or for the Government of the United States of America for governmental purposes without the payment of any royalties thereon or therefor.

This invention relates to a centrifugal separating device which operates to separate constituents of different densities from a fluid stream which passes through the device, and more particularly it relates to a centrifugal separator wherein the means which provides power to operate the separator forms an integral portion of the separator itself.

When the fluid stream contains entrained matter, the stream may be said to be "contaminated" and the entrained matter may be said to be the "contaminant." Often, it is desirable to separate the contaminant from the fluid stream to thereby provide a stream of "pure" or uncontaminated fluid. This separation can be effectuated by putting the fluid stream into rotation about an axis, whereby if the contaminant has a higher specific gravity than the pure fluid, it will tend to move radially outward from the axis of rotation leaving substantially pure fluid in the region immediately surrounding the axis of rotation. If the opposite condition should exist and the contaminant should have a lesser specific gravity than the fluid, the contaminant would remain in the region immediately surrounding the axis of rotation and the pure fluid would move radially outward. This latter situation, however, is extremely unlikely since, in the vast majority of cases, the contaminant has a higher specific gravity than the fluid stream in which it is entrained.

To put a fluid stream into rotation to accomplish the aforementioned separation, a centrifugal separator is employed. Though there are numerous types of centrifugal separators, the basic principle of all of them is to put the fluid containing portion of the separator into rotation to achieve centrifugal separation of the fluid. A motor is usually used to create this rotation, and the motor is generally external to the fluid containing or rotary portion of the separator. Thus, a shaft, shaft seals, motor and shaft bearings are required to transmit the rotational power to the rotary portion of the separator. These bearings and seals are subject to leakage and other problems such as cleaning, lubricating, replacement and the like. Recently, the present inventor solved these motor problems by jointly inventing an electric motor which dispensed with the conventional shaft and shaft bearings, but retained their function. This is accomplished by developing a hydrodynamic fluid of ambient fluid between the rotor and stator elements during operation of the motor. This particular electric motor is the subject matter of patent application Serial No. 225,943 (Navy Case No. 34,086), filed September 24, 1962, now Patent 3,183,384, issued May 11, 1965, in the joint names of the present inventor and Robert J. Flaherty.

The present invention contemplates utilizing the principles of he above-mentioned application in a centrifugal separator which has as one of its objects, the provision of a unitized device wherein the rotary motor part also serves as the rotary separator part.

Another object of this invention is to provide a centrifugal separator having an integral motor which supplies operative power for the separator, and wherein the fluid stream to be separated acts as a coolant for the electric motor and also acts to position the relatively rotational parts of the motor by creating a fluid film between such parts.

A further object of this invention is to provide a centrifugal separator having a self-contained motor in which the rotor and stator parts have smooth coacting surfaces and in which the rotary separator portion is operated by the motor rotor, said rotor and stator coacting surfaces acting as positioning and supporting elements for each other and for said rotary separator portion, thus eliminating the need for separate positioning and supporting bearings and thereby reducing the weight and volume of the separator, and thus also eliminating the need for a shaft which previously was needed to transmit positioning forces between separate bearing elements and the rotor.

Still another object of this invention is to provide a centrifugal separator which is compact and rugged, which has means for controlling the rate of flow of fluid to be separated, and in which means are provided for distributing part of the pure separated fluid to the separator motor to cool and lubricate said motor.

Yet a further object of this invention is to provide a motor operated centrifugal separator which is constructed in such a manner that the separator and motor are integrally connected to form a single unit in which the interior of the motor rotor forms the rotary separating chamber of the separator, in which the critical interior working parts are suitably coated or encased within a liquid-impervious material to render the entire unit capable of being totally submerged within the liquid to be separated, and in which a portion of the liquid which has been purified by separation is permitted to circulate around the motor thus lubricating and cooling the same, permitting it to operate with higher electrical currents, reducing the noise generated by its operation, and eliminating the need for sealing elements, liners, and the like which previously were needed to protect the interior of such a unit from the deleterious effects of the liquid to be separated.

Still a further object of this invention is to provide a device which will separate the impurities out of a fluid stream by means of centrifugal force and which will discharge the impurities from one point in the device and will discharge the pure separated fluid from another point in the device, and which will accomplish this separation without the use of filters or screens which are subject to clogging.

Other objects, advantages and salient features of the present invention will become apparent from the following description, taken in connection with the accompanying drawing, the sole figure of which illustrates a longitudinal sectional view of a preferred embodiment of a unitized centrifugal separator in accordance with the present invention.

Referring to the drawing, a centrifugal separator unit generally indicated as 10 is provided with an inlet end 12 and a discharge end 14. The unit is housed within an open-ended, hollow casing or housing member 16. The inlet end 12 of the unit is provided with an end plate 18 conforming generally in size and shape to the outside of the casing 16, and which is attached to the casing by means of a plurality of bolts 20 or other suitable fastening means. Sealing means such as gaskets or O-rings can be provided at the interface between the casing 16 and the end plate 18, if desired. The inlet end plate 18 is provided with a central aperture 22. The discharge end 14 of the unit is provided with an end plate 24 conforming generally in size and shape to the outside of the casing 16 and attached thereto by a plurality of bolts 26 or other suitable fastening means. A thrust bearing mounting ring 28, the purpose of which will be presently described, is mounted between the casing 16 and the discharge end plate 24. The discharge end plate 24 is provided wtih a central aperture 30 axially aligned along the longitudinal axis of the unit, with the inlet end plate central aperture 22.

A planar disc 32 having a central aperture 34 is mounted within the casing 16 by suitable means, such as welding. This disc divides the unit into two separate portions with the portion toward the inlet end containing the electric motor and thus defining a motor housing and the portion toward the outlet end containing the thrust bearing and thus defining a thrust bearing housing. The electric motor includes a stator member generaly indicated as 36, preferably conforming in shape to the inside of the casing 16, and mounted within said casing and fixedly attached thereto by means of segmental spacers 38 which space the stator slightly away from the interior casing walls to provide cooling passages or spaces. The stator 36 is comprised of a laminated core structure 40 and field windings 42, both of conventional electric motor type construction, preferably three phase. The stator is provided with a central internal cylindrical bore 44, having as its axis the longitudinal axis of the unit, which is also the axis of rotation of the unit, this axis being identified by the reference numeral 46.

A cylindrical rotor member 48 of the conventional laminated induction type, is freely mounted within the stator bore 44. The rotor 48 is provided with a central internal bore, both the rotor and its bore having as their central axis, the axis of rotation 46, and thus being coaxial with the stator bore 44. The outer surface of the rotor 48 and the inner surface of the stator 36, as defined by the walls of the bore 44, define the complemental working surfaces of the motor and, as such, are mating and coacting substantially smooth continuous surfaces, with the outer diameter of the rotor 48 being very slightly smaller than the diameter of the stator bore 44, to thereby provide an annular clearance region between the stator and the rotor.

To permit the separator to operate without sealing off the motor portion from the fluid stream when the fluid is a liquid, the rotor and stator members are coated with or encapsulated in an epoxy resin or other similar material to render them impervious and inert to the deleterious effects of the liquid. The rotor and stator elements are treated separately after which the stator bore surface and the rotor outer surface are properly machined and polished to provide a clearance therebetween equivalent to that normally utilized in a normal journal bearing, which is 0.001 to 0.003 inch of clearance per inch of rotor diameter. A specific coating and an encapsulation process have been disclosed in the co-pending application mentioned above, and a model of a motor treated in such a manner has been operated in sea water for long periods of time without suffering any adverse effects.

A hollow tube 50 is mounted within the rotor bore and is fixedly secured to the rotor itself, whereby rotation of the rotor causes a corresponding rotation of the tube 50. The tube itself extends through and beyond the apertures 22 and 34. A resilient flap-type sealing ring means 52 is affixed to the outside surface of the inlet end plate 18 by cementing or other suitable affixation means. The ring 52 has an inner diameter smaller than the aperture 22 and also smaller than the outside diameter of the tube 50 with the result that, as the tube 50 is passed through the ring 52, the ring deforms slightly to allow such passage. Thus, the ring forms a seal which normally prevents fluid passage between the aperture 22 and the outside of the tube 50, but which is deformable to allow such fluid passage when a pressure differential exists due to increased pressure inside the casing 16. A ring 54 similar to the ring 52 is mounted on the discharge side of the disc 32 to normally seal off flow between the aperture 34 and the outside of the tube 50.

The discharge end of the tube 50 extends for a distance beyond the ring 54 and is affixed to a thrust runner 56 in the form of a planar disc. The outer periphery of the thrust runner 56 contains a sealing ring 58 of some self-lubricating material such as carbon graphite, Teflon (tetrafluoroethylene resin), or the like. The sealing ring 58 fits into an axially elongated groove 60 in the inner surface of the casing 16, the ring and groove cooperating to prevent fluid flow between the thrust runner 56 and the casing 16 while permitting limited axial movement of said thrust runner 56 with respect to the casing 16. The thrust runner 56 has a mating thrust runner 62 of smaller diameter, which is spaced away the runner 56 by means of a spacing member 64. The surfaces of the thrust runners which contact the spacing member 64 define bearing surfaces, the purpose of which will be presently described. The thrust runners 56 and 62, and the spacing member 64 are all provided wtih central apertures in which a secondary hollow tube 66 is suitably affixed, as, for example, by shrink fitting.

The axis of the secondary tube 66 is coaxial with the axis of rotation 46. The inlet end of the secondary tube extends within the hollow tube 50 to approximately the position of the dividing disc 32, while the outlet end 67 of the secondary tube extends through and beyond the discharge end plate aperture 30. At the point where the secondary tube 66 passes through the aperture 30, a sealing ring 68, similar to the sealing ring 58, is mounted between the tube 66 and a axially elongated groove 70 in the end plate 24. The sealing ring 68 and the groove 70 cooperate in the same manner as do the seal ring 58 and the groove 60.

An alternating current power source, preferably three phase, is provided at the stator field windings 42 by means of conductors 72 which extend through a substantially fluid-tight stopper 74 in the casing 16. When the windings 42 are energized by the power source, they create a rotating magnetic field in the stator laminations 40, which in turn causes rotation of the rotor 48 by means of induced current, in a manner well-known in conventional induction motors. The rotation of the rotor 48 causes a corresponding rotation of the hollow tube 50 which is affixed to it, and thus also causes rotation of the thrust runners 56 and 62, the thrust runner spacing member 64, and the secondary tube 66, all of which are affixed to the tube 50.

The device is subject to a certain amount of endwise or axial thrust, particularly upon de-energization of the motor. The rotor 48, the tube 50, and all of their connected equipment can move axially because of the provision of the axially elongated grooves 60 and 70 in the fixed portion of the unit. However, to limit the amount of such axial movement, it is necessary to provide a thrust bearing means. The thrust bearing means includes the thrust runners 56 and 62, and also includes a thrust shoe in the form of a cylindrical disc 76 having a pair of substantially planar surfaces which mate in spaced relation with the bearing surfaces of the thrust runners 56 and 62, and having a central aperture 78 slightly larger diametrically than the spacing member 64. Since the thrust shoe 76 is of the double acting type in that it can absorb thrust in either axial direction, it is necessary that means be provided to insure proper orientation of the shoe at all times. To this end, a gimbal mounting means is provided which includes a first ring 80 having a pair of pins 82 defining an axis extending perpendicularly to the axis of rotation 46 and pivotally mounting the thrust shoe 76, and a second ring in the form of the disc 28 having a pair of pins 84 defining an axis extending perpendicularly to the axis of rotation 46 but displaced ninety degrees from the axis defined by the pins 82, and thus pivotally mounting the first ring 80. The entire gimbal mounting means is fixed and supported by means of the second ring 28 which is attached between the casing 16 and the discharge end plate 24.

An impeller, generally indicated as 86, is mounted withing the inlet end of the hollow tube 50 to draw fluid into the tube as it is rotated by the rotor 48. The impeller is shown as a ring 88 with impelling blades 90 mounted on the interior surface thereof, the whole structure being shrink fitted into the tube 50; however, any other suitable conventional form of impeller may be used. As the impeller rotates, fluid from the inlet end 12 of the unit is drawn into the tube 50. Due to the rotation of the tube 50, the fluid within the tube is set into rotation, and due to this rotation, a radial centrifugal force is exerted. If it is assumed that a particle of mass $m$ is rotating with an angular velocity $\omega$ at a distance $r$ away from the axis of rotation 46, the radial centrifugal force F acting on the particle is:

$$F = m\omega^2 r$$

When the fluid stream is contaminated and the contaminant is in the form of particulate matter having greater density than that of the stream, a particle of contaminant will have a mass greater than a particle of pure fluid and thus the radial centrifugal force for the particle of contaminant will exceed that for the particle of fluid. Thus, the contaminant will be forced through the fluid and toward the walls of the tube 50 by the centrifugal forces exerted, and the total effect is to create a separated fluid stream with the contaminated portion immediately adjacent the walls of the tube 50 and the pure or uncontaminated portion in the central axial region adjacent the axis of rotation 46.

A centrifugal separating pump in the form of a hollow cross-flow tube 92 extends transversely across the tube 50 at a point between the rotor 48 and the dividing disc 32. This tube 92 is provided with a cut-out section or central slot portion 94 of suitable design, located at the axial portion of the tube 50 and oriented toward its inlet end. Thus, as the impeller 86 forces fluid through the tube 50, part of the pure or uncontaminated fluid at the axial portion of the tube 50 enters the slot portion 94 and is pumped or expelled radially outward through the tube 92 and into the motor housing. The pure fluid thus directed to the motor housing forms a hydrodynamic film between the rotor and stator elements due to their relative rotation, and this film radially supports and positions the rotor 48 and renders it completely out of contact with the stator as the stator and rotor rotate relative to one another. The fluid introduced into the motor housing also acts as a coolant and cools the stator by flowing around the outside of it through the passages between the stator and the casing 16 which are formed by the spacers 38. As the centrifugal pump 92 introduces new fluid into the motor casing, the old fluid discharges through the aperture 22 by lifting the sealing means 52 slightly away from the walls of the tube 50.

As the separated fluid stream passes beyond the dividing disc 32, the pure or uncontaminated fluid at the axial portion enters the secondary tube 66 while the contaminated fluid at the walls of the tube 50 exits through tube discharge apertures 96 and through a unit discharge aperture 98. The sealing ring 54 prevents the contaminated fluid from flowing backward into the motor housing and the sealing ring 58 prevents the contaminated fluid from flowing forward into the thrust bearing housing. A slidable shutter 100 is provided on the casing 16 adjacent the discharge aperture 98 and is movable to vary the size of the aperture 98 and to thus control the rate of flow through the unit.

Passages 102 are formed through the secondary tube 66 and the spacer ring 64 and communicate with the aperture 78 in the thrust shoe 76 to supply clean fluid to the thrust bearing. As the tube 50 is rotated by the rotor 48, the secondary tube 66 also rotates and thus part of the pure fluid in the secondary tube 66 is expelled outward and into the thrust bearing housing. The thrust runners 56 and 62 rotate along with the secondary tube 66 while the thrust shoe 76 remains stationary, and this relative rotation causes a hydrodynamic thrust bearing film to be created between each thrust shoe bearing surface and its associated thrust runner bearing surface.

An exhaust port 104 is provided in the thrust bearing housing to allow the spent film fluid to be exhausted. Check valve means should be provided for the port 104 to prevent dirty, contaminated fluid from outside the unit from entering the thrust bearing housing. A conventional resilient flap valve 106 is shown for accomplishing this purpose, but any other suitable conventional form of check valve means can be employed.

The remaining pure fluid, which is not diverted through the passages 102, is discharged from the discharge end 67 of the secondary tube 66. It can thus be seen that the present device provides a compact, efficient separator unit wherein only pure fluid circulates around the motor and the thrust bearing and wherein the separation is effected without the use of screens or filters which create clogging problems. The present device can readily separate two immiscible liquids such as oil and water, or a liquid from its entrained particulate matter, such as water and dirt, and consequently, it is particularly adaptable to marine applications. For example, the outboard water lubricated bearings of ships' main propeller shafts are subject to heavy abrasive wear because the lubricating water is usually heavily contaminated. The present invention can be used to remedy such problems by attaching the separator unit 10 to the bearing housing with its discharge end 67 providing clean pure lubricating water. Lip-type seals such as 52 and 54 placed at the ends of the bearing housing prevent the intrusion of dirt while permitting the clean water to be discharged from the housing.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A centrifugal separator for separating constituents of different densities in a fluid stream which passes through said separator, and for discharging said separated constituents from distinct points, said separator comprising, in combination:

a hollow casing member having closed end portions each provided with a central aperture one of which serves as an inlet and the other of which serves as an outlet, said inlet and outlet being axially aligned along the central axis of the casing member which also serves as the axis of rotation for the separator;

dividing means within said casing member having a central aperture in axial alignment with said inlet and outlet and dividing said casing into two separate chambers, the chamber between said inlet and said dividing means comprising a motor housing and the chamber between said outlet and said dividing means defining a thrust bearing housing;

motor means located within said motor housing and including rotor and stator means concentrically arranged about said axis of rotation with a small annular space between the rotor and stator mating surfaces, said stator means being secured in said motor housing against relative rotation therebetween;

a separating tube affixed to and extending through said rotor means with the axis of said tube being coaxial with said axis of rotation, the inlet end of said separating tube extending through said casing inlet and the discharge end of said separating tube extending through the central aperture in said dividing means;

a discharge tube coaxial with and diametrically smaller than said separating tube, having its inlet end extending within the discharge end of said separating tube, and having its discharge end extending through said casing outlet;

a pair of spaced thrust runners located within said thrust bearing housing and affixed to said discharge tube with at least one of said thrust runners affixed to the discharge end of said separating tube whereby rotor rotation causes said separating tube, said discharge tube, and said thrust runners to rotate in unison therewith;

a thrust shoe located in said thrust bearing housing between said spaced thrust runners and mounted in nonrotatable mounting means whereby relative rotation can occur between said thrust shoe and said thrust runners, said thrust shoe and thrust runners defining a thrust bearing;

impeller means mounted on the inlet end of said end of said separating tube to draw fluid axially into said tube;

power supply means to energize said motor means to rotate said rotor about the axis of rotation;

said rotor rotation causing a centrifugal force to be exerted upon the fluid contained within said separating tube to separate said fluid with the portion of the fluid having the greater density moving away from the axis of rotation and toward the walls of said separating tube and the portion of the fluid having the lesser density remaining in the axial region of said separating tube and subsequently flowing into said discharge tube;

means in said separating tube for supplying fluid from the axial portion of that tube to the annular space between said rotor and stator means wherein due to relative rotation between said rotor and stator, the fluid creates a hydrodynamic film which totally radially supports said rotor means during rotation thereof; and means in said discharge tube for supplying fluid from that tube to said thrust bearing wherein, due to relative rotation between said thrust runners and said thrust shoe, the fluid creates a hydrodynamic film which absorbs axial thrust developed by said separator.

2. A centrifugal separator as defined in claim 1 wherein the mating surfaces of said rotor and stator means are coated with a resinous material which renders them impervious and inert to the deleterious effect of the fluid when the fluid is a liquid.

3. A centrifugal separator as defined in claim 1 wherein said small annular space has a radial dimension of between 0.001 and 0.003 inch per inch of rotor diameter.

4. A centrifugal separator as defined in claim 1 wherein said thrust shoe mounting means is a gimbal-type mount permitting angular movement of said thrust shoe about the axis of rotation.

5. A centrifugal separator as defined in claim 1 wherein the means in said separating tube for supplying fluid to the annular space between the rotor and stator means is a centrifugal separating pump in the form of a cross-flow tube having its inlet at the axial portion of said separating tube and having its outlet in said motor housing.

6. A centrifugal separator as defined in claim 1 wherein the means in said discharge tube for supplying fluid to the thrust bearing includes at least one radial flow passage through said discharge tube between said thrust runners.

7. A centrifugal separator as defined in claim 1 but further characterized by at least one radial discharge aperture in said separating tube near its discharge end at a location where said separating tube and said discharge tube overlap, whereby the portion of the fluid adjacent the walls of said separating tube will be expelled radially outward.

8. A centrifugal separator as defined in claim 7 but further characterized by a discharge aperture in said casing in substantial radial alignment with said separating tube radial discharge aperture, whereby the fluid expelled radially outward from said separating tube can be discharged from said centrifugal separator.

9. A centrifugal separator as defined in claim 8 but further characterized by adjustable means for regulating the effective size of said casing discharge aperture and thus controlling the flow rate of the fluid through said separator.

References Cited by the Examiner
UNITED STATES PATENTS

| | | | |
|---|---|---|---|
| 1,534,604 | 4/1925 | Ter Meer | 233—47 |
| 2,467,742 | 4/1949 | Hanno | 233—47 X |
| 2,519,971 | 8/1950 | LeClair | 233—46 X |
| 2,688,437 | 9/1954 | Monnet | 233—46 X |
| 3,006,699 | 10/1961 | Erlbacher | 184—6 X |
| 3,080,106 | 3/1963 | Ayling | 310—87 X |
| 3,135,211 | 6/1964 | Pezzillo | 310—87 X |
| 3,135,213 | 6/1964 | Smith et al. | 310—90 X |

M. CARY NELSON, *Primary Examiner.*